United States Patent
Takahashi et al.

(10) Patent No.: US 7,211,970 B2
(45) Date of Patent: May 1, 2007

(54) DISCHARGE LAMP LIGHTING DEVICE AND LIGHTING UNIT

(75) Inventors: Yuuji Takahashi, Sagamihara (JP); Keiichi Shimizu, Yokohama (JP)

(73) Assignee: Toshiba Lighting & Technology Corporation, Tokyo (JP)

( * ) Notice: Subject to any disclaimer, the term of this patent is extended or adjusted under 35 U.S.C. 154(b) by 0 days.

(21) Appl. No.: 11/302,356

(22) Filed: Dec. 14, 2005

(65) Prior Publication Data

US 2006/0097655 A1    May 11, 2006

Related U.S. Application Data

(63) Continuation of application No. PCT/JP04/18837, filed on Dec. 6, 2004.

(30) Foreign Application Priority Data

Dec. 17, 2003  (JP) ............................. 2003-419269
Mar. 23, 2004  (JP) ............................. 2004-085638

(51) Int. Cl.
*H05B 37/02* (2006.01)

(52) U.S. Cl. .................. 315/360; 315/307; 315/291; 315/362; 315/209 R; 315/244

(58) Field of Classification Search ............ 315/209 R, 315/244, 224, 194, 360, 362, 291, 294, 307, 315/308, DIG. 5, DIG. 7

See application file for complete search history.

(56) References Cited

U.S. PATENT DOCUMENTS 5,142,203 A * 8/1992 Oda et al. ................... 315/308
5,804,924 A * 9/1998 Ohnishi et al. .............. 315/160
5,828,187 A * 10/1998 Fischer ....................... 315/291
2006/0132044 A1* 6/2006 Takahashi et al. ............. 315/46

FOREIGN PATENT DOCUMENTS

| JP | 2-202365 A | 8/1990 |
|---|---|---|
| JP | 10-243661 | 9/1998 |
| JP | 11-220889 A | 10/1999 |
| JP | 2001-52889 A | 2/2001 |
| JP | 2002-324688 A | 11/2002 |
| JP | 2003-224981 A | 8/2003 |

* cited by examiner

*Primary Examiner*—Haissa Philogene
(74) *Attorney, Agent, or Firm*—DLA Piper US LLP

(57) ABSTRACT

A resonance load circuit is supplied with the high-frequency voltage from the inverter circuit, and includes an inductor, a capacitor and a discharge lamp. The resonance load circuit is so that a declination with respect to the lighting frequency fs is set to a range from −20° to 40° in impedance when the discharge lamp is operating at rating. The CPU continuously generates a pulse voltage for driving on and off the switch elements at a cycle shorter than a lighting cycle of the discharge lamp based on program data and data stored in a memory, and makes pulse-width modulation with respect to an on-state width of the pulse voltage in accordance with a waveform change of a sinusoidal voltage corresponding to the lighting cycle, and further, supplies an approximately sinusoidal current to the discharge lamp using a high-frequency output from the inverter circuit.

7 Claims, 14 Drawing Sheets

DISCHARGE LAMP LIGHTING DEVICE AND LIGHTING UNIT

CROSS-REFERENCE TO RELATED APPLICATIONS

This is a Continuation Application of PCT Application No. PCT/JP2004/018837, filed Dec. 16, 2004, which was published under PCT Article 21(2) in Japanese.

This application is based upon and claims the benefit of priority from prior Japanese Patent Applications No. 2003-419269, filed Dec. 17, 2003; and No. 2004-085638, filed Mar. 23, 2004, the entire contents of both of which are incorporated herein by reference.

BACKGROUND OF THE INVENTION

1. Field of the Invention

The present invention relates to a discharge lamp lighting device and lighting unit.

2. Description of the Related Art

Conventionally, a discharge lamp lighting device having the following circuit configuration has been known (e.g., see JPN. PAT. APPLN. KOKAI Publication No. 10-243661). According to the circuit configuration, a direct current (DC) power supply is connected in series with a pair of switch elements. One switch element is connected in parallel with a resonance load circuit including inductor, capacitor and discharge lamp. Direct voltage is converted into high frequency voltage by the switching operation of each switch element so that it is supplied to the discharge lamp. With the foregoing circuit configuration, power loss of the switch element and the inductor is reduced to improve power conversion efficiency.

BRIEF SUMMARY OF THE INVENTION

However, there is a problem that control becomes complicated in the foregoing device, which reduces power loss of both switch element and inductor to improve power conversion efficiency. Moreover, there is a possibility that current limiting effect of the inductor becomes small; as a result, the discharge lamp is not maintained in a stable lighting state.

According to the present invention, there is provided a discharge lamp lighting device, which can reduce invalid power to improve power conversion efficiency, and lighting unit Moreover, according to the present invention, there is provided a discharge lamp lighting device, which can make inductance small while maintaining a discharge lamp in a stable lighting state, and lighting unit.

DETAILED DESCRIPTION OF THE INVENTION

Embodiments of the present invention will be described below with reference to the accompanying drawings.

First Embodiment

Figure 1:
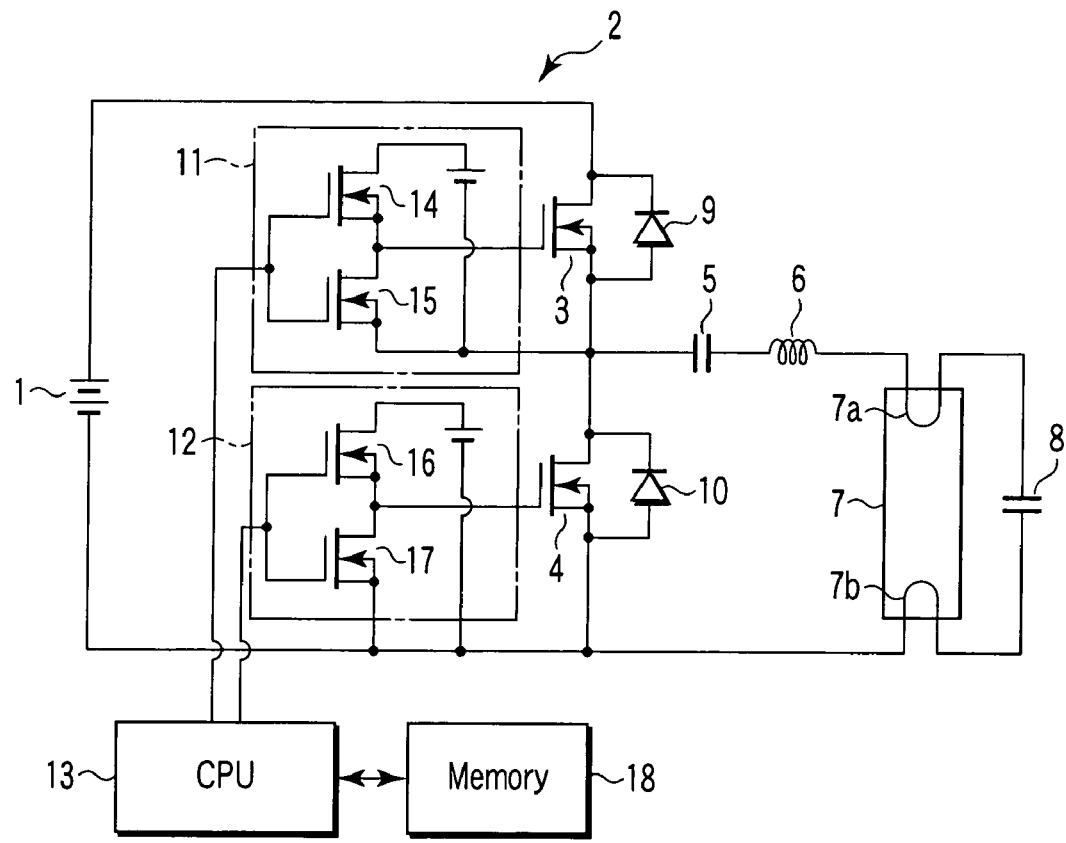
FIG. 1 is a circuit diagram showing the configuration of (a discharge lamp lighting device according to) a first embodiment of the present invention, and partly including a block diagram.

As shown in FIG. 1, a DC power supply 1 is connected with a high-frequency inverter circuit 2. The high-frequency inverter circuit 2 has the following circuit configuration. Specifically, a serial circuit comprising a pair of MOSFETs 3 and 4 is connected to the DC power supply 1. The drain terminal of the MOSFET 4 is connected to one terminal of one filament electrode 7a of a discharge lamp 7 via serial-connected first capacitor 5 and inductor 6. The source terminal of the MOSFET 4 is connected to one terminal of the other filament electrode 7b of the discharge lamp 7. A second capacitor 8 is connected to carry a preheat current across the other terminals of the filament electrodes 7a and 7b.

The foregoing inductor 6, discharge lamp 7 and second capacitor 8 form a resonance load circuit including an LC serial resonance circuit. The first capacitor 5 is a capacitor for cutting off a direct current. The MOSFETs 3 and 4 are connected in parallel with diodes 9 and 10 as parasitic diodes, respectively.

The gates of the MOSFETs 3 and 4 are individually connected with drive circuits 11 and 12. The drive circuits 11 and 12 are driven and controlled according to a signal from a CPU 13 forming a control circuit. The drive circuit 11 comprises a pair of MOSFETs 14 and 15; on the other hand, the drive circuit 12 comprises a pair of MOSFETs 16 and 17. These drive circuits 11 and 12 amplify the signal from the CPU 13 to supply on and off signals to each gate of the MOSFETs 3 and 4.

Figure 2:
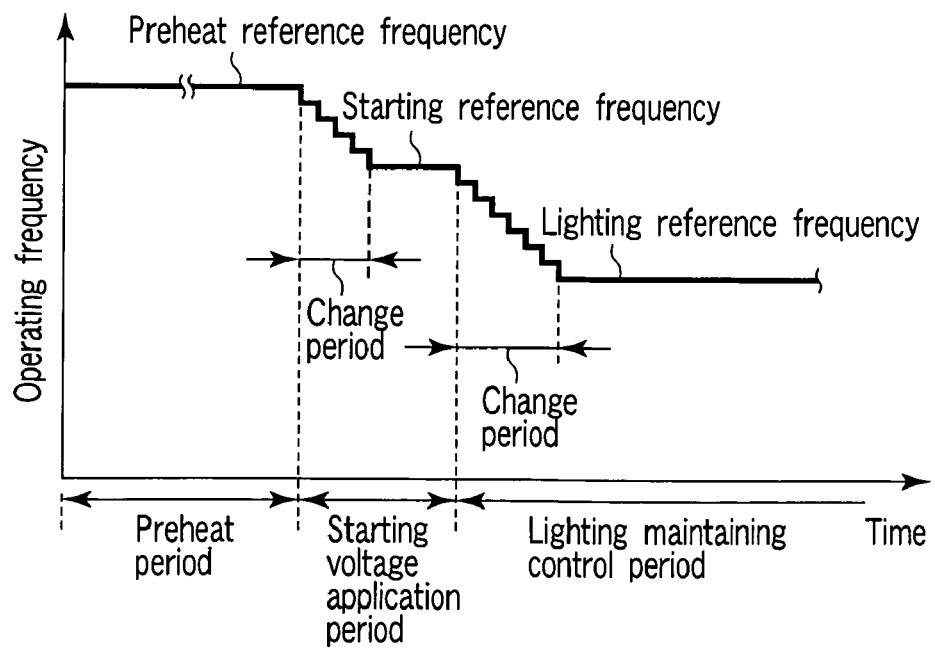
FIG. 2 is a chart showing each operating reference frequency in preheating period, starting voltage application period and lighting-maintained control period, and a frequency change when the period shifts in the first embodiment.

The CPU 13 has a built-in timer, and controls timing of signals supplied to the drive circuits 11 and 12 based on sequence programs and data stored in a memory 18. In other words, the CPU 13 carries out control shown in FIG. 2 when the start operation is made. Specifically, the CPU 13 gives preheat to the discharge lamp 7 for a predetermined time, and thereafter, applies a starting high voltage for a predetermined time. After the discharge lamp is lighted, the CPU 13 carries out control for maintaining lighting.

The CPU 13 sets an operating frequency to a high reference frequency for the preheat period, and based on the reference frequency, outputs a signal to drive circuit 11 and 12. Based on the reference frequency, the drive circuits 11 and 12 alternately switch and drive the MOSFETs 3 and 4, respectively.

When the preheat of the predetermined time is completed, the period shifts to a starting voltage application period. Then, the CPU 13 reduces the operating frequency to change it to the starting reference frequency. In this case, the operating frequency is not rapidly reduced in short time such as msec order, but stepwise reduced to shift it to the starting reference frequency. The change period of stepwise reducing the operating frequency is set to about 10 msec, for example. In the starting period, a starting high voltage is applied to the discharge lamp 7.

When the discharge lamp 7 starts lighting after a predetermined time elapses, the period shifts to a lighting maintaining control period. Then, the operating frequency further reduces to become a lighting reference frequency. In this case, the operating frequency is not rapidly reduced in short time such as nsec order, but stepwise reduced to shift it to the lighting reference frequency.

Figure 3:
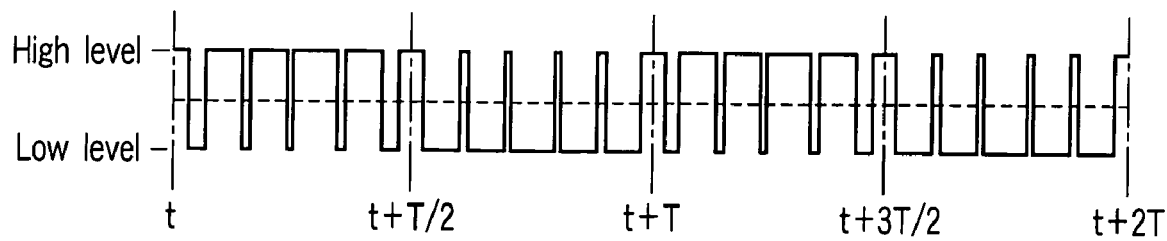
FIG. 3 is a waveform chart showing a drive signal for driving on and off a MOSFET in the first embodiment.

In the control period of maintaining the lighting of the discharge lamp 7, the CPU 13 carries out the following control. Specifically, a lighting period when the discharge lamp 7 is lighted by high frequency voltage from the high-frequency inverter circuit 2, that is, lighting cycle (1/lighting frequency) is set as T. One cycle of the lighting cycle T is divided into n, that is, ten (10) sections to generate a pulse voltage for driving on and off MOSFETs 3 and 4 for each section. The on-state width of the pulse voltage is changed in accordance with a waveform change of a sinusoidal voltage corresponding to the lighting cycle T. In other words, pulse width modulation is made with respect to the on-state width in the following manner. Namely, the on-state width changes into medium→large medium→small→medium→large . . . in accordance with peak value, average value or absolute value of effective value of the voltage value of each section. The CPU 13 supplies the pulse-width modulated signal to the drive circuit 11. By doing so, the drive circuit 11 supplies a drive signal shown in FIG. 3 to the MOSFET 3 to drive on and off it. Moreover, the CPU 13 supplies a drive on and off signal reverse to the signal supplied to the drive circuit 11 to the drive circuit 12. The drive circuit 12 supplies the drive signal to the MOSFET 4 to drive it on and off.

Figure 4:
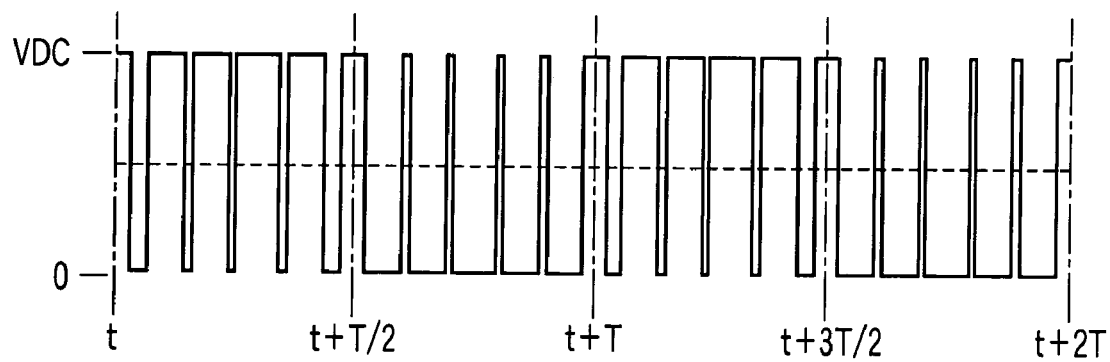
FIG. 4 is a waveform chart showing a voltage generated across each MOSFET of an inverter circuit in the first embodiment.

In the lighting maintaining control period, the CPU 13 drives on and off the paired MOSFETs 3 and 4 of the inverter circuit 2 at the foregoing timing. By doing so, a pulse voltage shown in FIG. 4 is generated across the MOSFET 4 of the inverter circuit 2. The pulse voltage waveform is supplied to the resonance load circuit comprising the foregoing first capacitor 5, inductor 6, discharge lamp 7 and second capacitor 8. In the resonance load circuit, a harmonic component is removed by filter effect of the inductor 6 and the capacitor 8. As a result, a voltage waveform applied to the discharge lamp 7 is given as an approximately sinusoidal voltage waveform shown in FIG. 5. Thus, a sinusoidal current flows through the discharge lamp 7.

In the lighting maintaining control period after the discharge lamp 7 is lit, the lighting cycle T is divided into ten sections to generate a pulse voltage for driving on and off MOSFETs 3 and 4 for each divided section. The on-state width of the pulse voltage is changed in accordance with a waveform change of a sinusoidal voltage corresponding to the lighting cycle T. In other words, pulse width modulation is made so that the on-state width changes into medium→large→medium→small→medium→large . . . . By doing so, a sin wave-shaped current is supplied to the discharge lamp 7 from the inverter circuit 2; therefore, reactive power is reduced. This serves to improve power conversion efficiency.

The discharge lamp 7 is preheated for a predetermined time after the operating frequency is set to high reference frequency. Thereafter, the operating frequency is reduced to the starting reference frequency to apply a starting voltage. In this case, the operating frequency is stepwise reduced while being shifted to the starting reference frequency. Therefore, circuit stress is made small when the operating frequency is shifted, and there is no possibility that circuit elements are broken down in starting. The reference frequency reduces when the discharge lamp 7 is lit in starting. In also case, the operating frequency is stepwise reduced, and shifted to the reference frequency of the lighting maintaining period. Therefore, circuit stress is made small.

Second Embodiment

The same reference numerals are used to designate components identical or corresponding to the foregoing first embodiment; therefore, the details are omitted.

Figure 6:
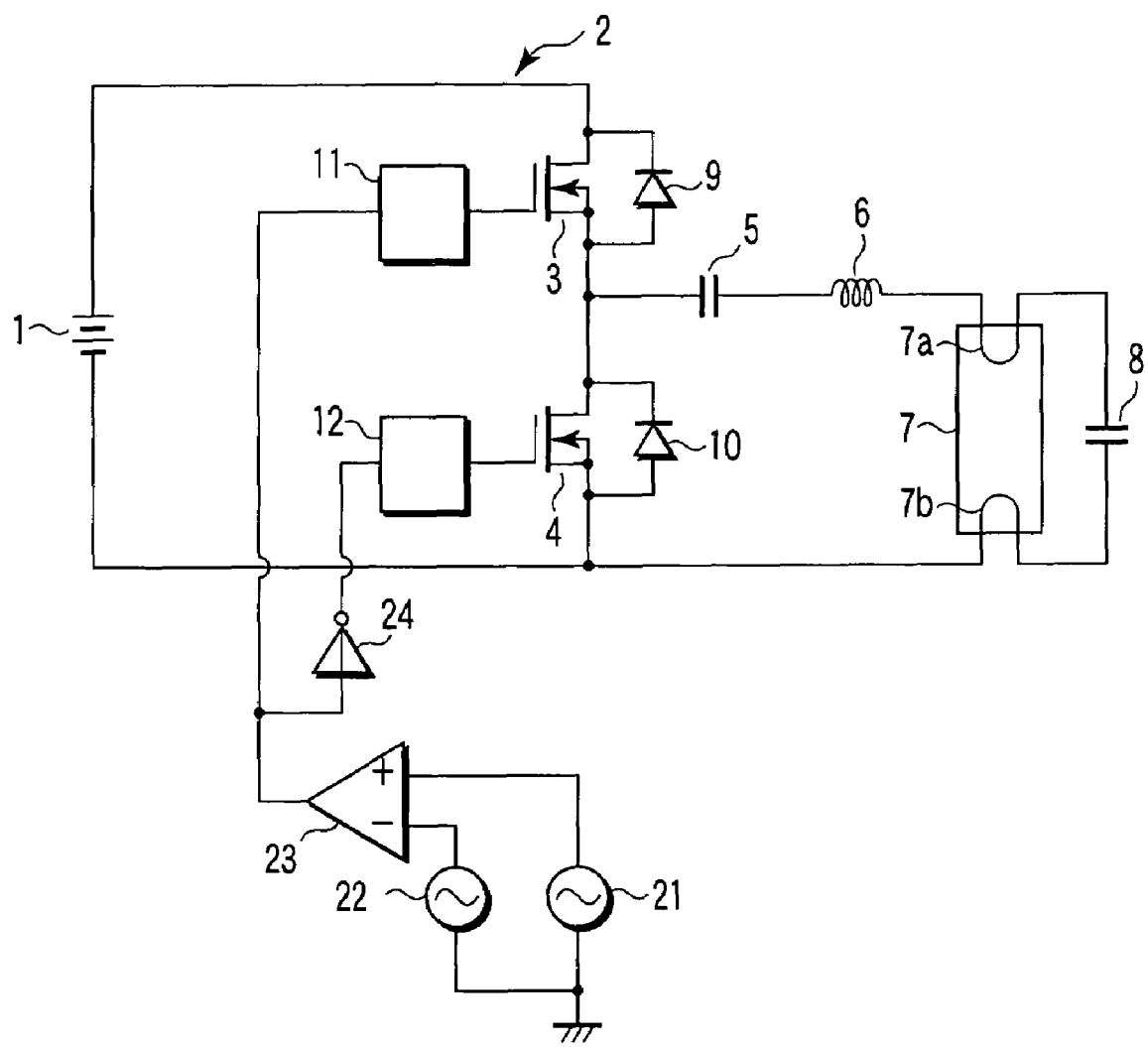
FIG. 6 is a diagram showing the circuit configuration of a second embodiment of the present invention.

According to the second embodiment, as depicted in FIG. 6, a hardware circuit is used in place of the CPU to carry out on/off control with respect to MOSFETs 3 and 4 of the inverter circuit 2. Specifically, the hardware circuit is provided with sinusoidal voltage source (generator) 21, triangular wave signal source 22 and comparator 23. The sinusoidal voltage source 21 generates a sinusoidal voltage having a frequency fL. The triangular wave signal source 22 generates a triangular wave signal having a frequency of integer multiples of the sinusoidal voltage frequency fL generated from the sinusoidal voltage source 21. The comparator 23 compares the sinusoidal voltage from the sinusoidal voltage source 21 with the triangular signal from triangular wave signal source 22. The comparator 23 outputs a high level signal if the sinusoidal voltage is higher than a triangular wave signal voltage while outputting a low level signal if it is less than that. The output signal of the comparator 23 is supplied to the drive circuit 11 while being supplied to the drive circuit 12 via an inversion circuit 24. The frequency fL of the sinusoidal voltage generated from the sinusoidal voltage source 21 corresponds to the lighting cycle, that is, lighting frequency of the discharge lamp 7.

Figure 7A:
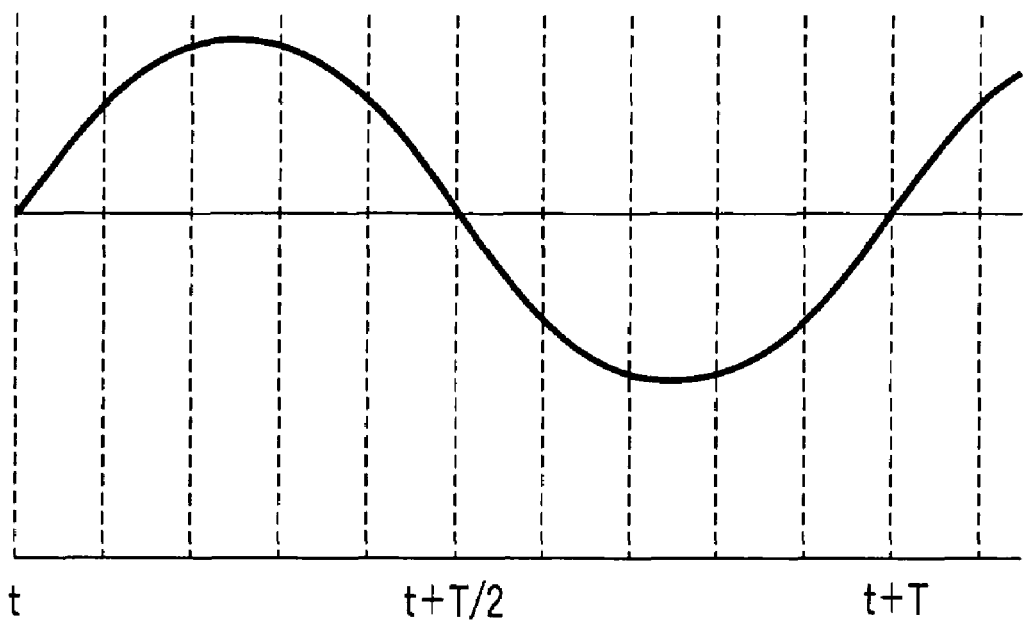
FIG. 7A is a waveform chart showing a sinusoidal voltage output from a sinusoidal voltage source in the second embodiment.

With the foregoing configuration, a sinusoidal voltage shown in FIG. 7A is generated from the sinusoidal voltage source 21. In this case, the comparator 23 outputs a pulse voltage shown in FIG. 7B, in which one cycle of the lighting cycle is divided into ten sections, and pulse-width modulation is made for each divided section. The pulse voltage is supplied to the drive circuit 11 while being supplied to the drive circuit 12 via the inversion circuit 24.

The pulse voltage of each section changes into high or low level in accordance with an average value of the sinusoidal voltage of each section. The smaller the average value is, the longer the period of outputting the low level becomes. On the other hand, the larger the average value is, the longer the period of outputting the high level becomes.

In the manner described above, pulse width modulation is made in accordance with the average value of the sinusoidal voltage of each section.

Figure 7B:
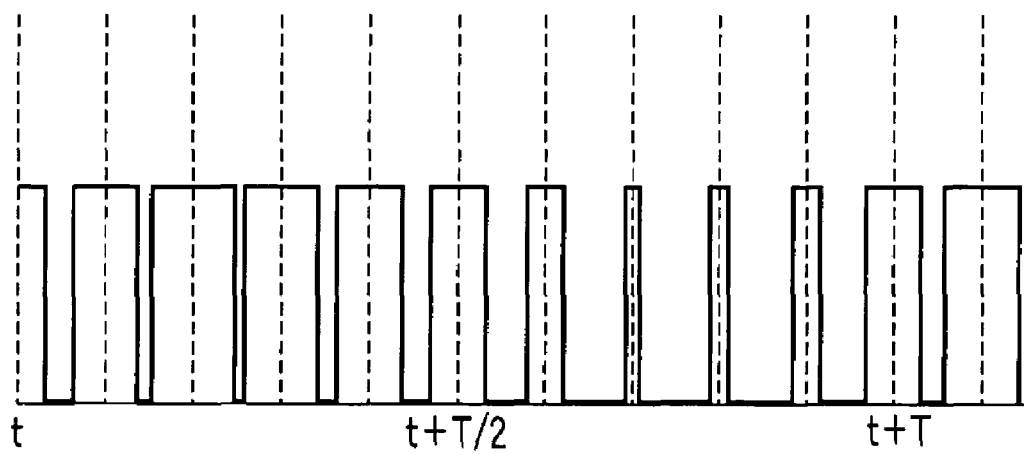
FIG. 7B is a waveform chart showing a pulse-width modulated pulse voltage output from a comparator in the second embodiment.

The drive circuit 11 drives on and off the MOSFET 3 using a drive signal having the same waveform as FIG. 7B. On the other hand, the drive circuit 12 drives on and off the MOSFET 4 using a drive signal having a waveform inverting the waveform of FIG. 7B.

Figure 5:
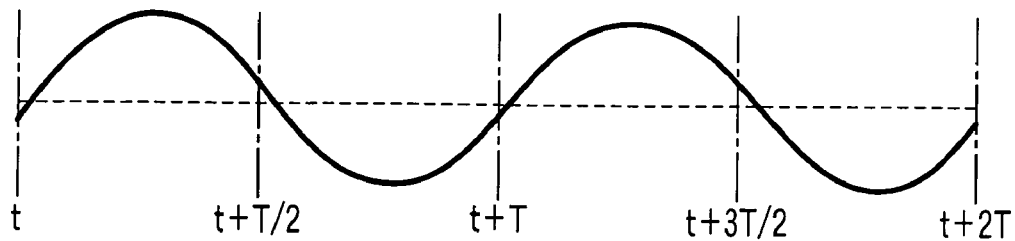
FIG. 5 is a waveform chart showing a voltage applied to a discharge lamp in the first embodiment.

By doing so, in the lighting maintaining control period, the pulse voltage shown in FIG. 4 is generated across the MOSFET 4 of the inverter circuit 2 like the foregoing first embodiment. The harmonic component of the pulse voltage is removed by the filter effect of the inductor 6 and the capacitor 8. Thus, a voltage having the approximately sinusoidal waveform shown in FIG. 5 is applied to the discharge lamp 7. As a result, a substantially sinusoidal current flows through the discharge lamp 7. Consequently, reactive power is reduced to improve power conversion efficiency in the second embodiment.

Third Embodiment

The same reference numerals are used to designate components identical or corresponding to the foregoing first embodiment; therefore, the details are omitted. According to the third embodiment, a lamp current is detected to carry out feedback control.

Figure 8:
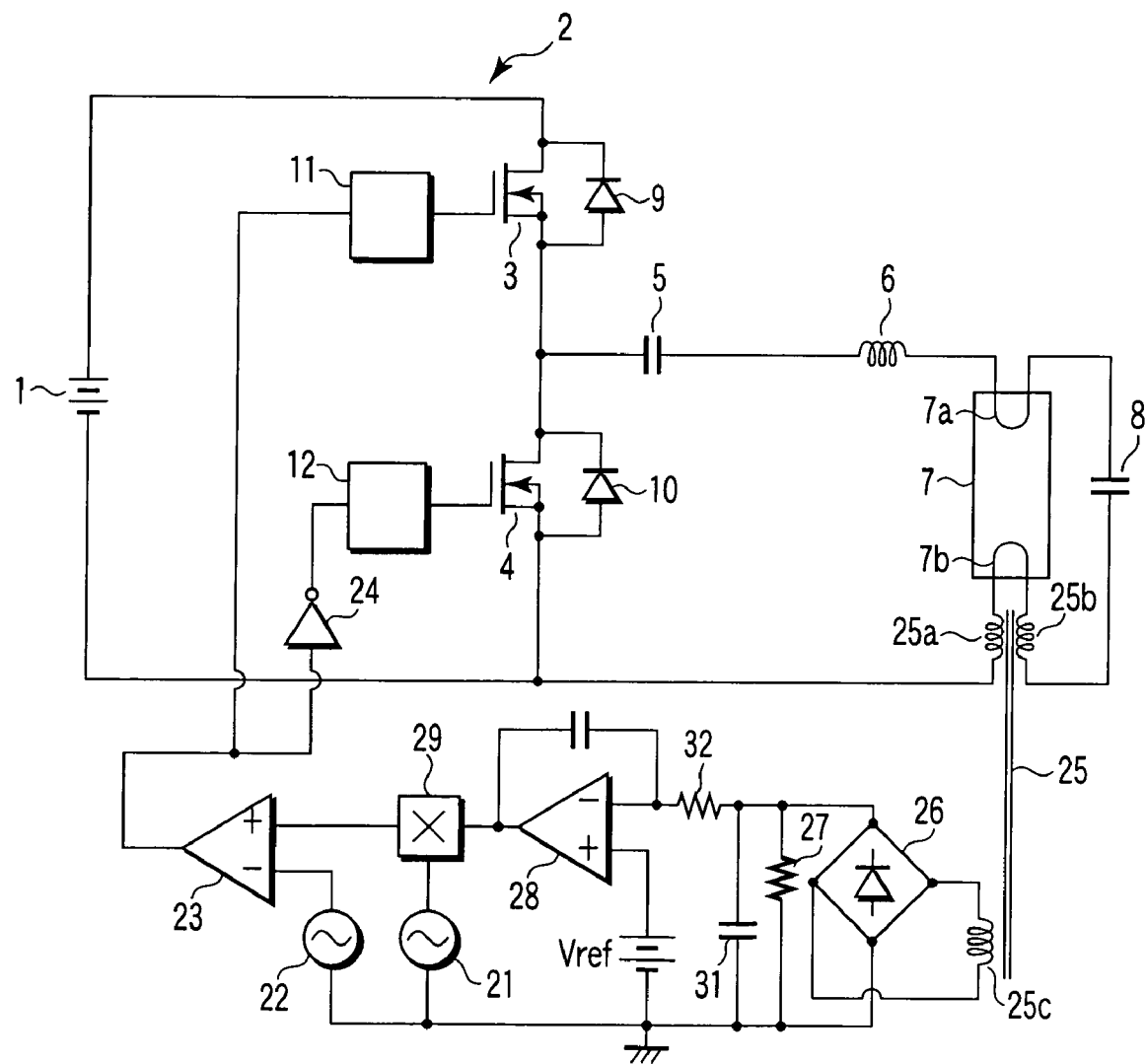
FIG. 8 is a diagram showing the circuit configuration of a third embodiment of the present invention.

As seen from FIG. 8, the other filament electrode 7b of the discharge lamp 7 is connected with a transformer 25 forming lamp current detection means. Specifically, each terminal of the filament electrode 7b is connected with one terminal of respective first and second windings 25a and 25b. The other terminal of the first winding 25a is connected to the source terminal of the MOSFET 4. The other terminal of the first winding 25b is connected to the capacitor 8.

There is further provided a third winding 25c, which is magnetically coupled with the foregoing windings 25a and 25b. An input terminal of a full-wave rectifier circuit 26 comprising a diode bridge is connected across the winding 25c.

A parallel circuit comprising resistor 27 and capacitor 31 is connected across output terminals of the full-wave rectifier circuit 26. An output voltage generated across the output terminals is supplied to an inverting input terminal (−) of an error amplifier 28 via a resistor 32. A non-inverting input terminal (+) of the error amplifier 28 is supplied with a reference voltage Vref.

An output from the error amplifier 28 is supplied to a multiplier 29. The multiplier 29 is supplied with a sinusoidal voltage from the sinusoidal voltage source 21. The multiplier 29 multiplies the sinusoidal voltage from the sinusoidal voltage source 21 and the output from the error amplifier 28 to vary the amplitude of the sinusoidal voltage, and then, supplies it to the comparator 23. The comparator 23 compares a sinusoidal voltage from the multiplier 29 with the triangular signal from the triangular signal source 22.

With the foregoing configuration, the transformer 25 detects the lamp current flowing through the discharge lamp 7. Specifically, when the lamp current flows via the first winding 25a, a voltage is induced in the third winding 25c. In this case, an influence by the current flowing via the capacitor 8 is removed by the relationship between the first and second windings 25a and 25b. Thus, a voltage by lamp current only is induced in the third winding 25c.

The voltage induced in the third winding 25c has a polarity inverted according to the direction of the lamp current. Therefore, the voltage becomes an alternating voltage, and thereafter, is applied to the input terminal of the full-wave rectifier circuit 26. Then, the output terminal if the full-wave rectifier circuit 26 outputs a full-wave rectified voltage. The full-wave rectified voltage is smoothened by the parallel circuit comprising resistor 27 and capacitor 31, and then, given as a DC voltage. The DC voltage is input to the inverting input terminal (−) of the error amplifier 28.

Figure 9A:
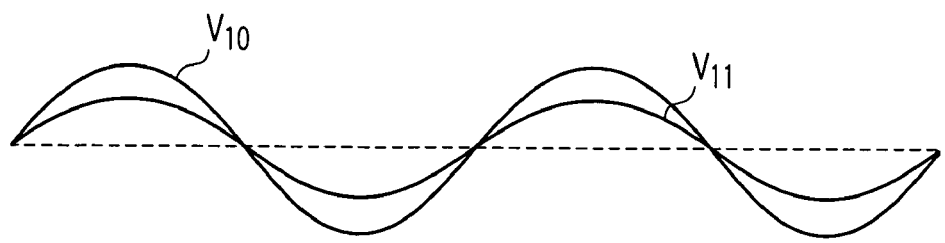
FIG. 9A is a waveform chart showing a voltage output from a multiplier in the third embodiment.
Figure 9B:
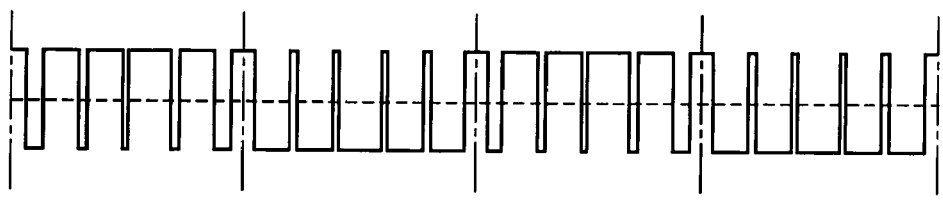
FIG. 9B is a waveform chart showing a pulse voltage output from a comparator in the third embodiment.

When the lamp current is in a steady state in the discharge lamp 7, the DC voltage input to the inverting input terminal (−) of the error amplifier 28 is approximately equal to the reference voltage Vref. In this case, the output from the error amplifier 28 becomes a value approximately equal to Vref. Therefore, the multiplier 29 has a voltage waveform shown by the waveform V10 in FIG. 9A, which is approximately equal to a voltage multiplying the sinusoidal voltage waveform from the sinusoidal voltage source 21 by Vref. The comparator 23 compares the sinusoidal voltage waveform from the multiplier 29 with the triangular signal from the triangular signal source 22. Then, the comparator 23 outputs a high level signal if the sinusoidal voltage from the multiplier 29 is higher than the triangular signal voltage from the triangular signal source 22. On the other hand, the comparator 23 outputs a low level signal if the sinusoidal voltage from the multiplier 29 is less than the triangular signal voltage from the triangular signal source 22. Thus, a pulse voltage output from the comparator 23 is shown in FIG. 9B. Therefore, in this case, a voltage having a waveform shown by the waveform 20V in FIG. 9D is applied to the discharge lamp 7.

In this state, when the lamp current of the discharge lamp 7 increases, the output of the full-wave rectifier circuit 26 becomes large. Thus, the voltage input to the inverting input terminal (−) of the error amplifier 28 becomes larger than the reference voltage Vref. As a result, the output from the error amplifier 28 becomes smaller than the reference voltage Vref. Therefore, the multiplier 29 has a voltage waveform, whose amplitude is smaller than the voltage waveform multiplying the sinusoidal voltage waveform from the sinusoidal voltage source 21 by Vref, as seen from the waveform V11 shown by in FIG. 9A. Namely, the amplitude of the voltage waveform from the multiplier 29 becomes small.

Figure 9C:
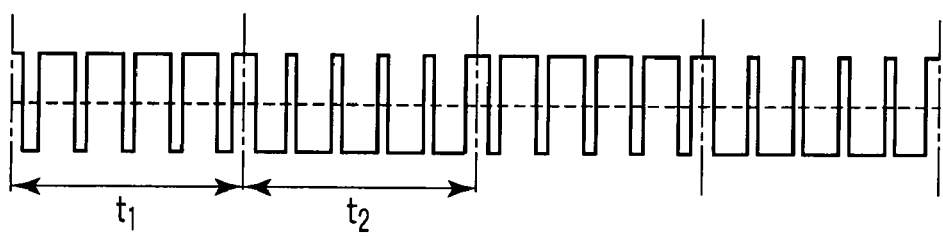
FIG. 9C is a waveform chart showing another pulse voltage output from the comparator in the third embodiment.
Figure 9D:
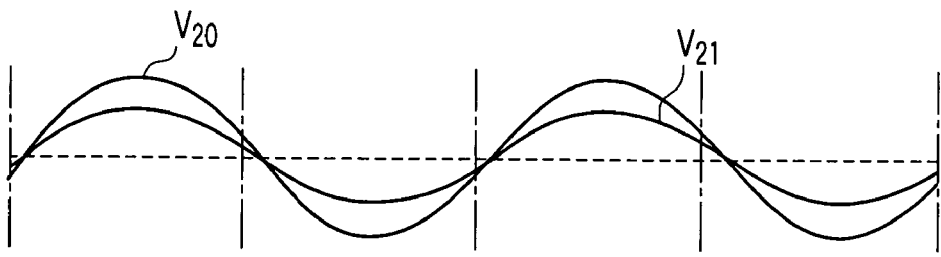
FIG. 9D is a waveform chart showing a current carrying through a discharge lamp in the third embodiment.

For this reason, the pulse voltage output from the comparator 23 is controlled so that a low level period becomes long in a section t1 while becoming short in a section t2, as depicted in FIG. 9C. As a result, the current flowing through the discharge lamp 7 has a waveform having small amplitude shown by the waveform V21 in FIG. 9D. Thus, the lamp current is prevented from being increased.

When the lamp current of the discharge lamp 7 decreases, the output of the full-wave rectifier circuit 26 becomes small, and the voltage input to the inverting input terminal (−) of the error amplifier 28 become smaller than the reference voltage Vref. As a result, the output from the error amplifier 28 becomes larger than the reference voltage Vref. Therefore, the amplitude of the voltage waveform from the multiplier 29 conversely becomes large. The pulse voltage output from the comparator 23 is controlled so that the low level period becomes short in the section t1 while becoming long in the section t2. As a result, the amplitude of the current flowing through the discharge current 7 becomes large; therefore, the lamp current is prevented from being decreased.

Consequently, the current flowing through the discharge current 7 is kept constant via the foregoing feedback control. Moreover, current-limiting effect is obtained via the foregoing feedback control. Therefore, even if the inductor 6 having small capacitance is used, sufficient current-limiting effect is obtained as a whole. As a result, the discharge lamp is stably kept in the lighting state. Of course, in the third embodiment, power conversion efficiency is improved using simple control like the foregoing embodiment.

Fourth Embodiment

According to the fourth embodiment, a lamp current is detected to carry out feedback control, like the third embodiment. The same reference numerals are used to designate components identical or corresponding to the foregoing third embodiment; therefore, the details are omitted.

Figure 10:
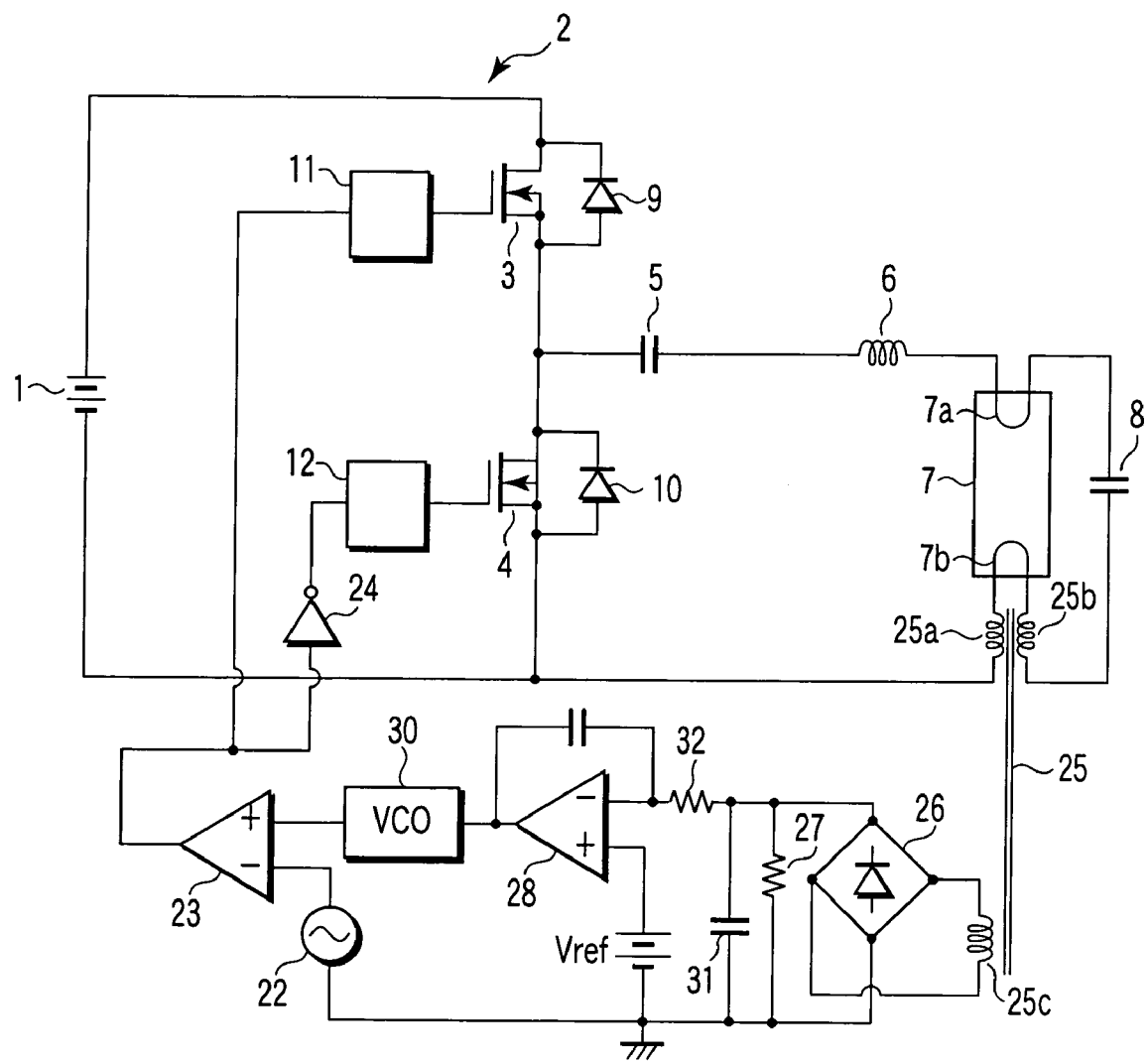
FIG. 10 is a diagram showing the circuit configuration of a fourth embodiment of the present invention.

As shown in FIG. 10, a voltage control oscillator (VOC) 30 is used in place of the foregoing sinusoidal voltage source 21 and multiplier 29 shown in FIG. 8. Other configuration is the same as FIG. 8. The output from the error amplifier 28 is supplied to the voltage control oscillator 30, and the output of the voltage control oscillator 30 is supplied to the comparator 23.

Figure 11A:
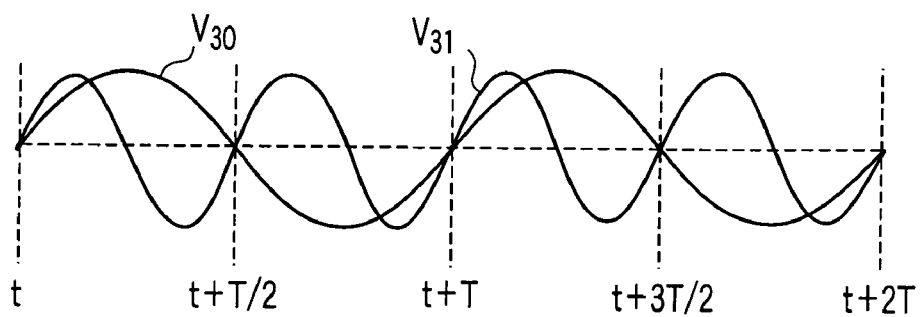
FIG. 11A is a waveform chart showing a voltage output from a voltage-controlled oscillator in the fourth embodiment.

When the lamp current is in a steady state in the discharge lamp 7, the DC voltage input to the inverting input terminal (−) of the error amplifier 28 is approximately equal to the reference voltage Vref. In this case, the output from the error amplifier 28 becomes a value approximately equal to Vref. Thus, the voltage control oscillator 30 outputs a sinusoidal voltage having a reference frequency fL as shown by the waveform V30 in FIG. 11A.

Figure 11B:
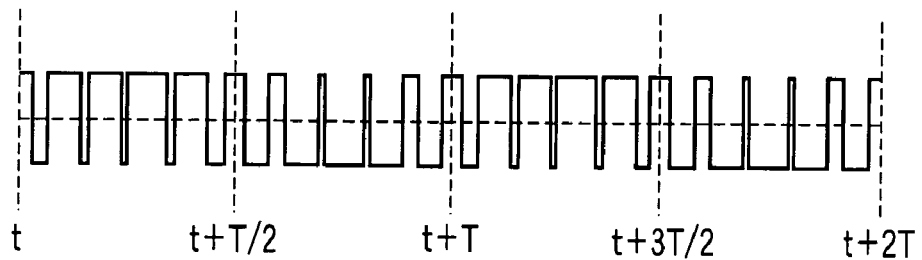
FIG. 11B is a waveform chart showing a pulse voltage output from a comparator in the fourth embodiment.

In this case, the pulse voltage output from the comparator 23 is shown in FIG. 11B. Therefore, a current having a waveform shown by the waveform V40 of FIG. 11D flows through the discharge lamp 7.

In this state, when the lamp current of the discharge lamp 7 increases, the output of the full-wave rectifier circuit 26 becomes large. Thus, the voltage input to the inverting input terminal (−) of the error amplifier 28 becomes larger than the reference voltage Vref. As a result, the output from the error amplifier 28 becomes smaller than the reference voltage Vref. Therefore, the voltage control oscillator 30 increases the frequency of the output sinusoidal voltage more than the reference frequency fL as seen from the waveform V31 in FIG. 11A.

Figure 11C:
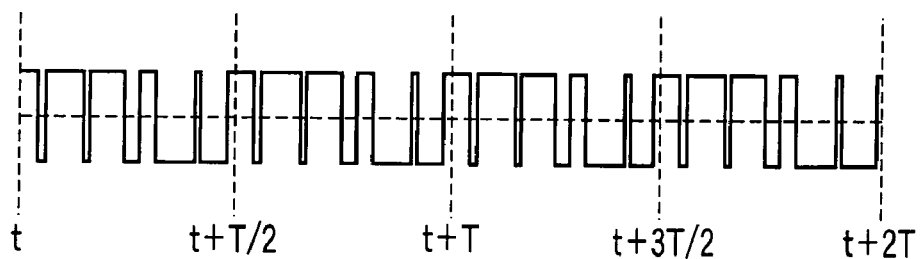
FIG. 11C is a waveform chart showing another pulse voltage output from the comparator in the fourth embodiment.
Figure 11D:
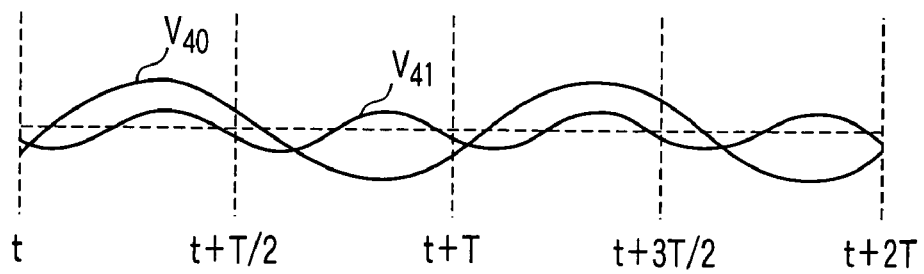
FIG. 11D is a waveform chart showing a current carrying through a discharge lamp in the fourth embodiment.

The sinusoidal voltage output from the voltage control oscillator 30 is compared with the triangular signal voltage from the triangular signal source 22 in the comparator 23. The comparator 23 outputs a high level signal if the sinusoidal voltage output from the voltage control oscillator 30 is higher than the triangular signal voltage from the triangular signal source 22. On the other hand, the comparator 23 outputs a low level signal if the sinusoidal voltage output from the voltage control oscillator 30 is less than the triangular signal voltage from the triangular signal source 22. Therefore, when the frequency of the sinusoidal voltage output from the voltage control oscillator 30 becomes high, the pulse voltage output from the comparator 23 changes as shown in FIG. 11C. As a result, the voltage applied to the discharge lamp 7 has a high frequency as shown by the waveform V41 in FIG. 11D; therefore, the lamp current is prevented from being increased.

Conversely, when the lamp current of the discharge lamp 7 decreases, the output of the full-wave rectifier circuit 26 becomes small, and the voltage input to the inverting input terminal (−) of the error amplifier 28 become smaller than the reference voltage Vref. As a result, the output from the error amplifier 28 becomes larger than the reference voltage Vref. By doing so, the frequency of the sinusoidal voltage output from the voltage control oscillator 30 is made lower than the reference frequency fL.

The frequency of the sinusoidal voltage output from the voltage control oscillator 30 becomes low, and thereby, the pulse voltage output from the comparator 23 changes in accordance with the foregoing frequency change. Therefore, the frequency of the voltage applied to the discharge lamp 7 becomes low; as a result, the lamp current is prevented from being decreased.

Consequently, the lamp current flowing through the discharge current 7 is kept constant via the foregoing feedback control. Moreover, current-limiting effect is obtained via the foregoing feedback control. Therefore, even if the inductor 6 having small capacitance is used, sufficient current-limiting effect is obtained as a whole. As a result, the discharge lamp is stably kept in the lighting state. Of course, in the third embodiment, power conversion efficiency is improved using simple control like the foregoing embodiment.

Fifth Embodiment

The fifth embodiment relates to the following setting. For example, in the second embodiment, that is, FIG. 6, the lighting frequency of the discharge lamp 7 is set as fs, and the frequency of the pulse voltage output from the comparator 23 is set as fc (>fs). In the output voltage frequency characteristics of the resonance load circuit using rated load, output voltages Vs and Vc of frequency fs component and frequency fc component are set to have a relation of Vs>Vc.

The foregoing setting is made, thereby changing the sinusoidal voltage from the sinusoidal voltage source 21. By doing so, it is possible to vary an output voltage supplied to a load, that is, discharge lamp 7, and to sufficiently secure the control margin of the output voltage.

Figure 12:
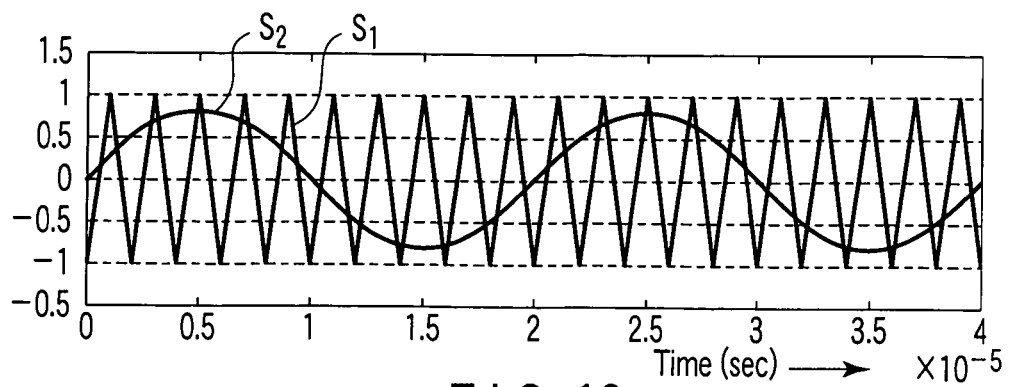
FIG. 12 is a waveform chart showing the amplitude of triangular wave signal and sinusoidal signal in a fifth embodiment of the present invention.
Figure 13:
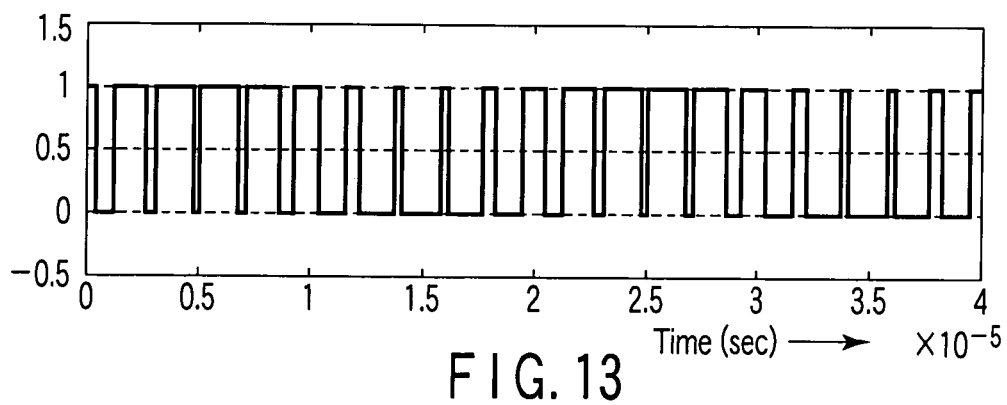
FIG. 13 is a waveform chart showing a pulse-width-modulated pulse voltage output from a comparator in the fifth embodiment.

For example, as shown in FIG. 12, the amplitude of a triangular wave signal S1 from the triangular wave signal source 22 is set as 1. The amplitude of a sinusoidal signal S2 from the sinusoidal voltage source 21 is set as 0.8. The lighting frequency of the discharge lamp 7 is set as 50 kHz, and the frequency fc of the pulse voltage output from the comparator 23 is set as 1 MHz. In this case, the comparator outputs an output "1" if the voltage of the sinusoidal signal S2 is larger than that of the triangular wave signal S1. On the other hand, the comparator outputs an output "0" if the voltage of the sinusoidal signal S2 is less than that of the triangular wave signal S1. The waveform of the pulse-width modulated pulse voltage output from the comparator 23 is as shown in FIG. 13.

Figure 14:
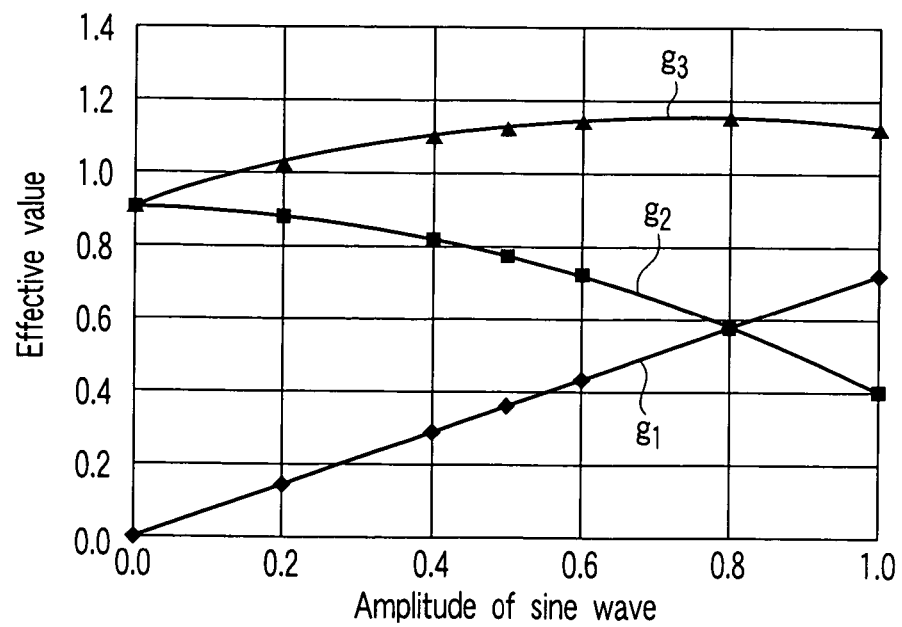
FIG. 14 is a graph showing effective values of frequency fs component and frequency fc component included in a pulse voltage output from the comparator in the fifth embodiment and the total effective value.

When the amplitude of the triangular wave signal S1 is set as "1", FIG. 14 is a graph showing effective values. In this case, FIG. 14 shows effective values of frequency fs and fc components included in the pulse voltage waveform output from the comparator 23 with respect to the amplitude of the sinusoidal signal S2. In the graph of FIG. 14, the curve g1 denotes an effective value of the frequency fs component, and the curve g2 denotes an effective value of the frequency fc component. The curve g3 denotes a value adding the effective values of the foregoing frequency fs and fc components.

The following matters can be seen from the graph of FIG. 14. For example, when the amplitude of the sinusoidal signal S2 is 0.6, the effective value of the frequency fs component is approximately 0.4 while the effective value of the frequency fc component is approximately 0.7. When the amplitude of the sinusoidal signal S2 is 0.8, the effective values of the frequency fs and fc components are both approximately 0.6. When the amplitude of the sinusoidal signal S2 is 1.0, the effective value of the frequency fs component is approximately 0.7 while the effective value of the frequency fc component is approximately 0.4. Moreover, when the amplitude of the sinusoidal signal S2 is 0.4 or more, it can be seen that the sum of the effective values of the frequency fs and fc components is constant at approximately 1.13.

Figure 15:
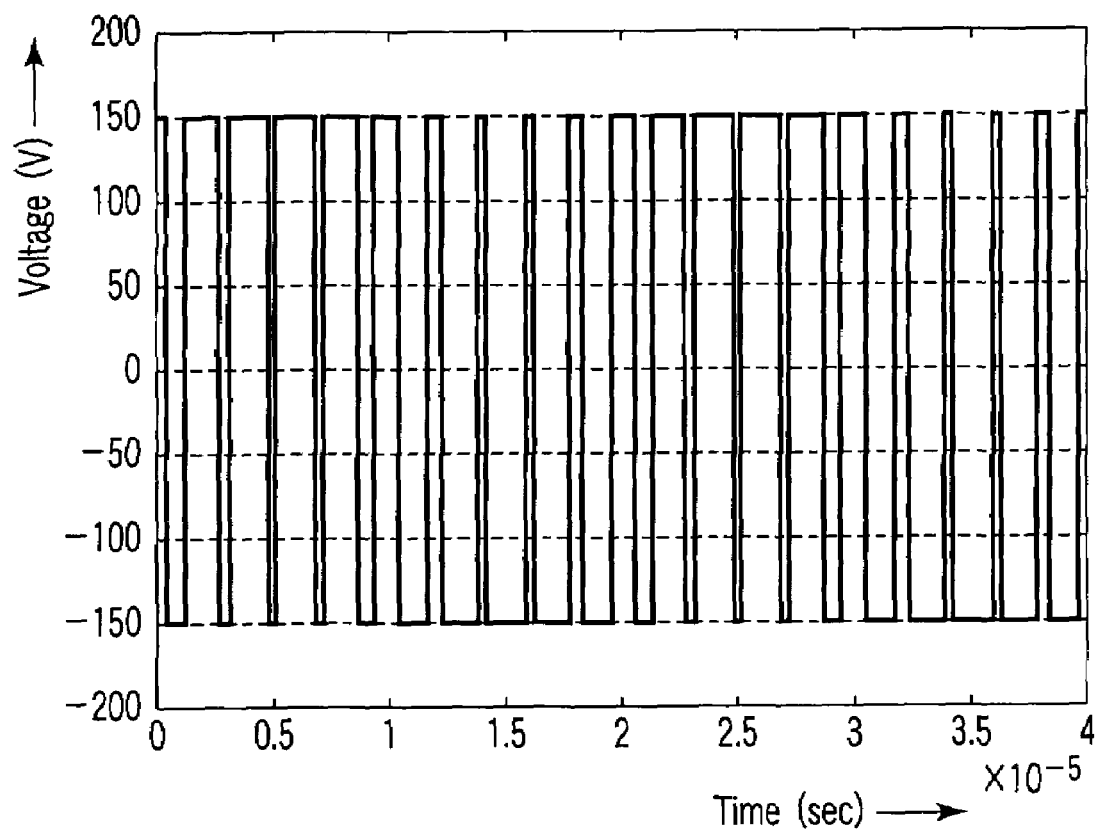
FIG. 15 is a waveform chart showing an output voltage of an inverter circuit in the fifth embodiment.

The pulse voltage from the comparator 23 is supplied to the drive circuit 11 to switch and drive the MOSFET 3 of the inverter circuit 2. Moreover, the pulse voltage is inverted using the inversion circuit 24, and thereafter, supplied to the drive circuit 12 to switch and drive the MOSFET 4 of the inverter circuit 2. By doing so, a pulse-width modulated output voltage shown in FIG. 15 is generated from the inverter circuit 2. The output voltage is supplied to the resonance load circuit comprising first capacitor 5, inductor 6, discharge lamp 7 and second capacitor 8. In this case, an output is supplied to a load, that is, discharge lamp 7 according to the frequency characteristics of the resonance load circuit.

Specifically, output corresponding to gain of the resonance load circuit is obtained with respect each frequency component included the pulse-width modulated output voltage output from the inverter circuit 2. Therefore, the output combining these outputs is supplied to the discharge lamp 7 as the final output.

In order to obtain the final output supplied to the discharge lamp 7 having an approximately sine wave, the following is required. Specifically, the harmonic component including the frequency fc component must be attenuated using the frequency characteristics of the resonance load circuit.

Moreover, it can be seen from the graph of FIG. 14 that if the effective value of the frequency fs component is made large, the effective value of the frequency fc component becomes small. For example, when the amplitude of the sinusoidal signal S2 is 0.6, the effective value of the frequency fs component is approximately 0.4 while the effective value of the frequency fc component is approximately 0.7. In this case, if each frequency power is supplied to an equivalent circuit of the resonance load circuit shown in FIG. 16 from a power supply AC, the following characteristics are obtained. Specifically, characteristics shown by solid lines in a graph of FIG. 17 are obtained as an output voltage generated across resistor R.

Figure 16:
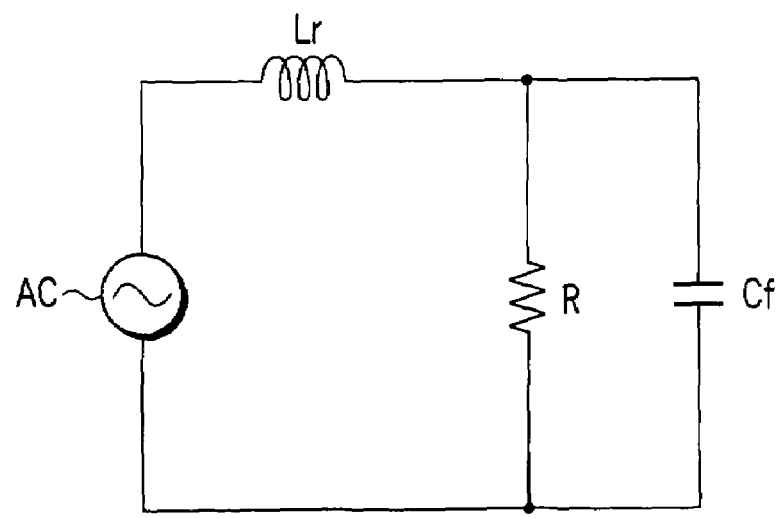
FIG. 16 is a diagram showing the circuit configuration of an equivalent circuit of a resonance load circuit in the fifth embodiment.

In the equivalent circuit of FIG. 16, Lr denotes an inductor component, Cf denotes a capacitor component and R denotes an equivalent load resistance in a rated operation of the discharge lamp 7.

The resonance frequency $(1/2\pi\sqrt{Lr \cdot Cf})$ of the resonance lad circuit is set larger than the frequency fs and lower than the frequency fc.

Figure 17:
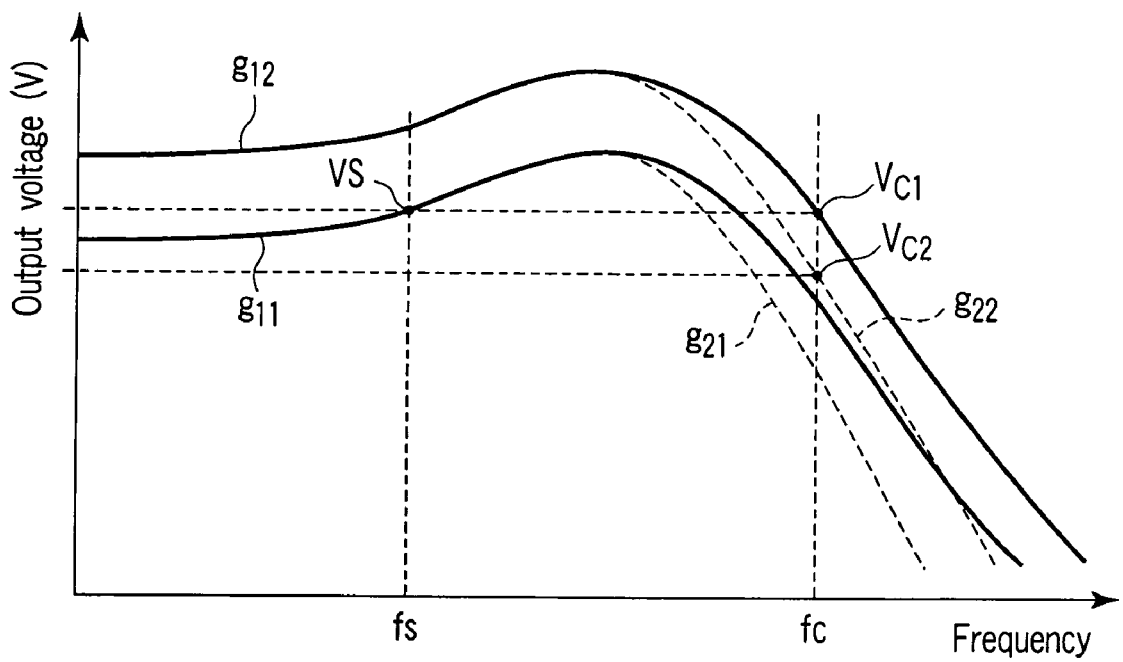
FIG. 17 is a chart showing output voltage characteristics generated across each resistor (resistance) R when each frequency power from a power supply is supplied to the equivalent circuit shown in FIG. 16 changing its effective value.

In the graph of FIG. 17, the solid line curve g11 shows the case where the effective value of the AC is approximately 0.4. The solid line curve g11 shows the case where the effective value of the AC is approximately 0.7. This corresponds to the case where the amplitude of the sinusoidal signal S2 is set as 0.6.

As seen from the graph of FIG. 14, when the amplitude of the sinusoidal signal S2 is set as 0.6, the effective value of the frequency fs component is approximately 0.4 while the effective value of the frequency fc component is approximately 0.7. The sum of the foregoing effective values is substantially constant. Moreover, when the amplitude of the sinusoidal signal S2 is changed from 0.8 to 1.0, the effective value of the frequency fs component becomes large while that of the frequency fc becomes small. However, the sum of the foregoing effective values is substantially constant, that is, unchanged.

This implies that the same frequency characteristic as above is given in the pulse-width modulated output voltage output from the inverter circuit 2 when the inverter circuit 2 is driven using the pulse voltage from the comparator 23. Specifically, when the amplitude of the sinusoidal signal S2 is changed from 0.6 to 1.0, each effective value of the frequency fs and fc components is variable in the output voltage from the inverter circuit 2. However, the sum of these values is approximately constant.

In FIG. 17, the relationship between the following output voltages Vs and Vc1 is investigated. The foregoing Vs is an output voltage in the frequency fs when the effective value of the AC is approximately 0.4. The foregoing Vc1 is an output voltage in the frequency fc when the effective value of the AC is approximately 0.7. As a result, if Lr and Cr are set so that both output voltages Vs and Vc1 become approximately equal, the effective value of the output voltage is not almost unchanged even if the amplitude of the sinusoidal signal is changed from 0.4 to 1.0.

Figure 18:
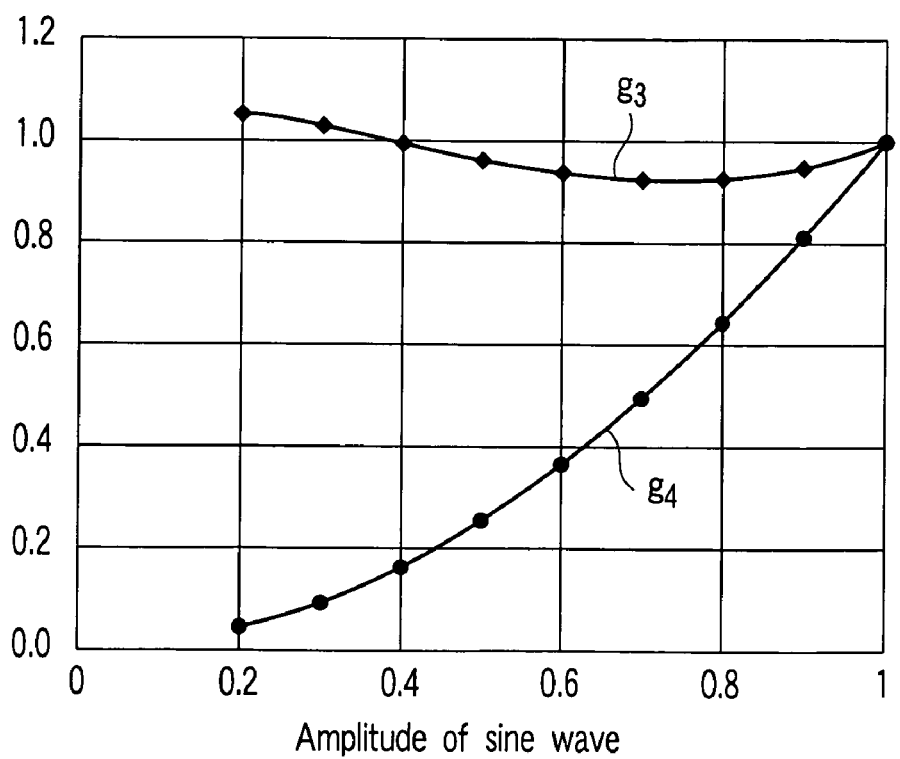
FIG. 18 is a graph showing the final output supplied to the discharge lamp when changing the amplitude of a sinusoidal signal under the condition of Vs=Vc and Vs>Vc in the fifth embodiment.

In other words, the following matter is given in the relationship such that the foregoing output voltages of the frequency fs and fc become approximately equal. Specifically, it can be seen that even if the amplitude of the sinusoidal signal S2 is changed from 0.2 to 1.0, the final output supplied to the discharge lamp 7 is almost unchanged as shown by the curve g3 in a graph of FIG. 18.

Thus, the present inventors have made a proposal that difference is given between the output voltage Vs of the frequency fs and the output voltage Vc of the frequency fc. From the characteristics shown in FIG. 17, inductor component Lr and capacitor component Cf are changed, or the frequency fc is changed, and thereby, the relationship of Vs>Vc is set. The experiment about the foregoing setting has been made.

The foregoing inductor component Lr and capacitor component Cf were set so that the output voltage is largely reduced in the vicinity of the frequency fc. Thereafter, output voltage characteristics appearing across the resistor R were measured. When the effective value of the AC is approximately 0.4, the characteristic shown by the broken line curve g21 in the graph of FIG. 17 was obtained. Moreover, when the effective value of the AC is approximately 0.7, the characteristic shown by the broken line curve g22 in the graph of FIG. 17 was obtained. From the foregoing characteristic, the relationship of Vs>Vc2 was given between the output voltage Vs of the frequency fs when the AC is approximately 0.4 and the output voltage Vc2 when the frequency fc the AC is approximately 0.7.

Under the condition described above, the amplitude of the sinusoidal signal S2 was changed from 0.2 to 1.0. As a result, it can be seen that the final output supplied to the discharge lamp 7 changes as shown by the curve g4 in the graph of FIG. 18. Specifically, the frequency of the discharge lamp 7 is set as fs, and the frequency of the pulse voltage output from the comparator 23 is set as fc (>fs). In the frequency characteristic of the output voltage of the resonance load circuit using equivalent load resistance in the rated operation of the discharge lamp 7, the following setting is made. Namely, setting is made so that the relationship of Vs>Vc is obtained between the output voltage Vs of the frequency fs component and the output voltage Vc of the frequency fc component. By doing so, the amplitude of the sinusoidal voltage from the sinusoidal voltage source 21 is changed to vary the output voltage supplied to the discharge lamp 7. In addition, control margin of the output voltage is sufficiently secured.

By doing so, the amplitude of the sinusoidal voltage from the sinusoidal voltage source 21 is changed to carry out dimming control with respect to the discharge lamp 7. Moreover, the output is simply controlled to suit to the rating of the discharge lamp 7 to be lighted.

From the solid line curve g12 shown in the graph of FIG. 17, it can be seen that the frequency fc is made large, and thereby, the output voltage Vc1 of the frequency fc is reduced. Therefore, the amplitude of the sinusoidal voltage from the sinusoidal voltage source 21 is changed to vary the output voltage supplied to the discharge lamp 7. In this case, the frequency fc may be made large without changing inductor component Lr and capacitor component Cf.

The fifth embodiment is applied to the second embodiment; however, this is not limited to the second embodiment. The fifth embodiment may be applied to the first, third and fourth embodiments.

Sixth Embodiment

In the fifth embodiment, the frequency of the discharge lamp 7 is set as fs, and the frequency of the pulse voltage output from the comparator 23 is set as fc (>fs). In the frequency characteristic of the output voltage of the resonance load circuit using equivalent load resistance in the rated operation of the discharge lamp 7, the following setting is made. Namely, setting has been made so that the relationship of Vs>Vc is obtained between the output voltage Vs of the frequency fs component and the output voltage Vc of the frequency fc component. According to the fifth embodiment, the following condition is given. That is, a declination of impedance of the resonance load circuit using rated load is set to a range from −200 to 400 with respect to the lighting frequency fs of the discharge lamp 7.

Specifically, the combination of inductor component Lr and capacitor component Cf for supplying a desired power to the discharge lamp 7 exists with respect to direct-current voltage VDC supplied to the inverter circuit 2 to infinity. For this reason, it is difficult to simply specify the combination of inductor component Lr and capacitor component Cf to reduce reactive power and circuit loss.

On the other hand, in the equivalent circuit of FIG. 16, impedance Z of the resonance load circuit is expressed using the following equation in the light of the power supply AC.

$$Re(Z)+j\cdot Im(Z)=j\omega Lr+1/(1/R)+j\omega Cf$$

Figure 19:
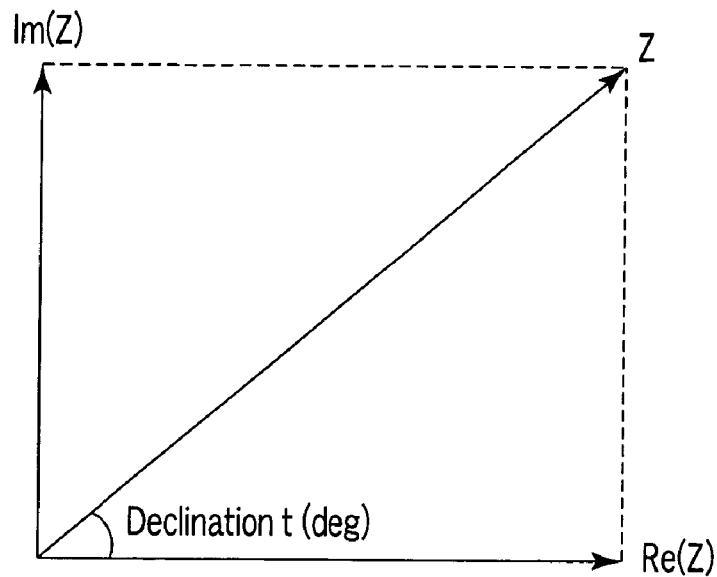
FIG. 19 is a view to explain the declination of a resonance load circuit in a sixth embodiment of the present invention.

When representing the foregoing equation using a vector, the vector is as shown in FIG. 19. In this case, an angle made by impedance Z and the real part "Re(Z)" is a declination. That is, the declination=$\tan^{-1}(Im(Z)/Re(Z))$ is given.

The declination is made small from the vector shown in FIG. 19, and thereby, it is possible to reduce the imaginary part. This serves to reduce reactive power. Therefore, the resonance load circuit is specified using the declination of the impedance Z of the circuit in order to reduce the reactive power and circuit loss.

For example, the following condition is given.
Direct current voltage VDC: 350V
Lighting frequency fs: 20 kHz
Frequency fc of pulse voltage: 200 kHz
Equivalent resistance in rated operation of discharge lamp 7: 300Ω
Rated current of discharge lamp 7: 0.37 A Under the foregoing condition, declination is successively changed into −40°, −20°, 0°, 20°, 40° and 60°. Then, when plotting power VA generated in the inductor component Lr at that time, the result shown in FIG. 20 was obtained.

Figure 20:
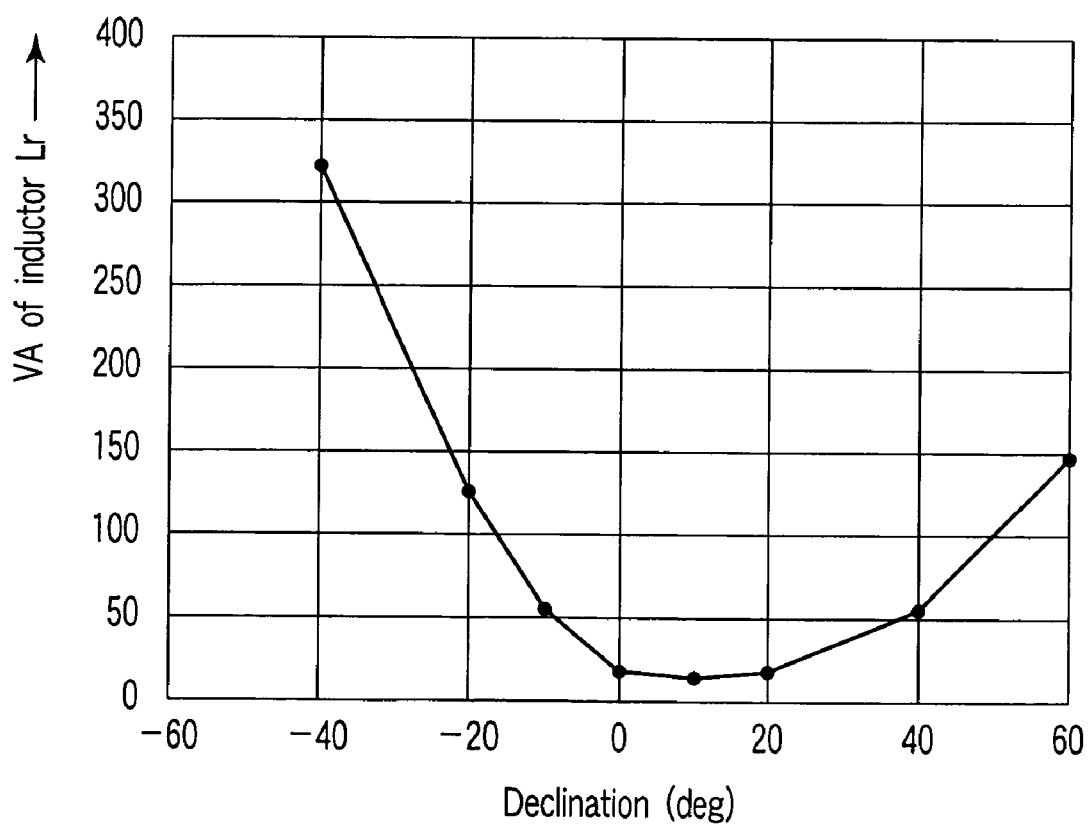
FIG. 20 is a graph showing the relationship between declination and power VA generated in an inductor component Lr in the sixth embodiment.

From the result shown in FIG. 20, if the declination is set to a range from −20° to 40°, it is possible to make small the power VA generated in the inductor component Lr, and therefore, to reduce reactive power. In particular, the power VA generated in the inductor component Lr is sufficiently made small in a range from 0° to 20°; therefore, the reactive power can be largely reduced.

On the contrary, if the declination becomes less than −20°, the power VA generated in the inductor component Lr rapidly increases. If the declination becomes more than 40°, the power VA generated in the inductor component Lr rapidly increases as well as the preceding case. Therefore, reactive power increases in the range that the declination is less than −20° and in the range it is more than 40°. For this reason, the foregoing range is not favorable because circuit loss becomes large.

Consequently, the declination is set to a range from −20° to 40°. By doing so, the power VA generated in the inductor component Lr is made small; therefore, circuit loss is reduced in the resonance load circuit. Moreover, the power VA generated in the inductor component Lr is made small; therefore, the using inductor 6 is made small size.

Seventh Embodiment

In the sixth, the frequency of the discharge lamp 7 is set as fs, and the frequency of the pulse voltage output from the comparator 23 is set as fc (>fs). In the frequency characteristic of the output voltage of the resonance load circuit using equivalent load resistance in the rated operation of the discharge lamp 7, the following setting is made. Namely, setting has been made so that the relationship of Vs>Vc is obtained between the output voltage Vs of the frequency fs component and the output voltage Vc of the frequency fc component. In addition, the declination of impedance of the resonance load circuit using rated load is set to a range from −20° to 40° with respect to the lighting frequency fs of the discharge lamp 7. According to the seventh embodiment, the following condition is further given. Specifically, the direct power supply voltage VDC applied to the inverter circuit 2 from the DC power supply 1 is set so that effective values VLrms and Virms become approximately equal to each other. The foregoing VLrms is an effective value of the lighting frequency fs component of the discharge lamp 7 included in a load voltage generated in the resonance load circuit using rated load. The foregoing Virms is an effective value of the lighting frequency fs component of the discharge lamp 7 included in an output voltage generated in the inverter circuit 2.

For example, the following condition is given in the discharge lamp lighting device having the circuit configuration shown in FIG. 6.

Lighting frequency fs of discharge lamp 7: 20 kHz

Frequency fc of pulse voltage: 200 kHz

Modulation degree of sinusoidal voltage generated from sinusoidal voltage source 21 with respect to triangular wave signal from triangular wave signal source 22: 0.9

Rated current of discharge lamp 7: 0.37 A

Lamp voltage: 113V

Under the foregoing condition, the impedance declination of the resonance load circuit is set to 0° with respect to DC power supply voltage VDC from DC power supply 1. Here, the resonance load circuit comprises first capacitor 5, inductor 6, discharge lamp 7 and second capacitor 8. Moreover, power VA generated in the inductor component Lr with respect to each DC power supply voltage VDC was measured using the voltage VDC as a parameter. The result shown in FIG. 21 was obtained.

Figure 21:
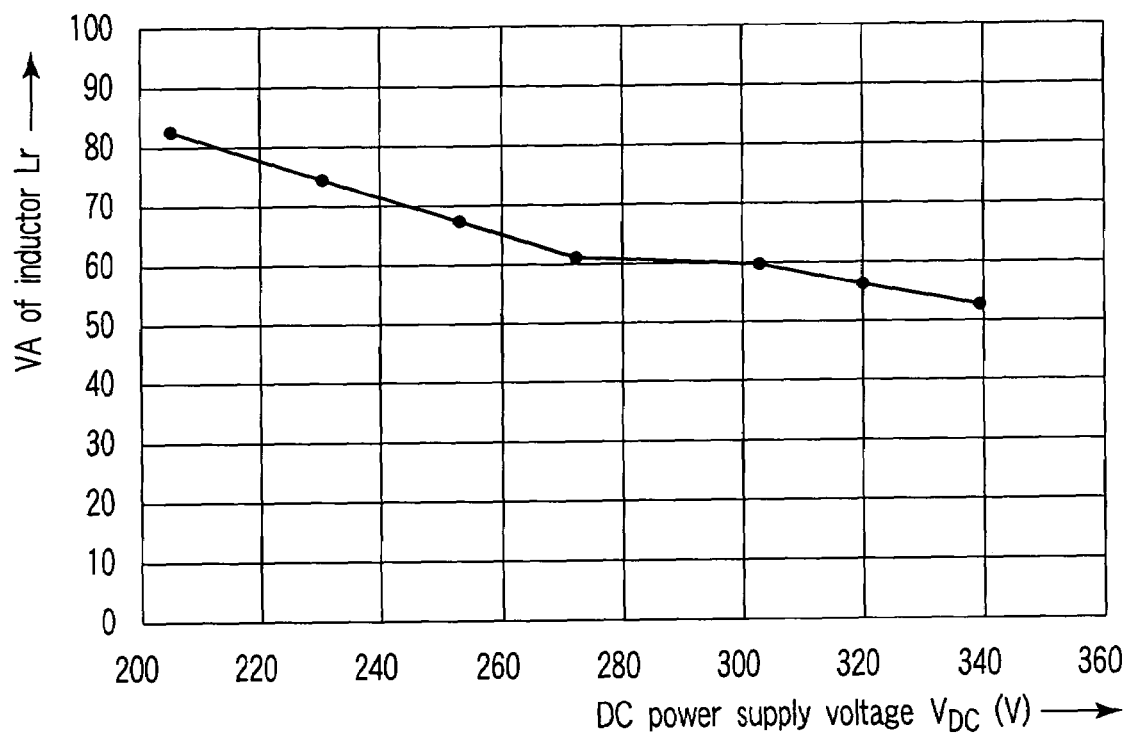
FIG. 21 is a graph showing power VA generated in an inductor component Lr when the impedance declination of a resonance load circuit is set to 0° in a seventh embodiment of the present invention.

A graph shown in FIG. 21 represents a state that the higher the DC power supply voltage VDC is set, the lower the power VA generated in the inductor component Lr becomes. In other words, this implies that the higher the DC power supply voltage VDC is set, the smaller size the inductor 6 is made into.

Figure 22:
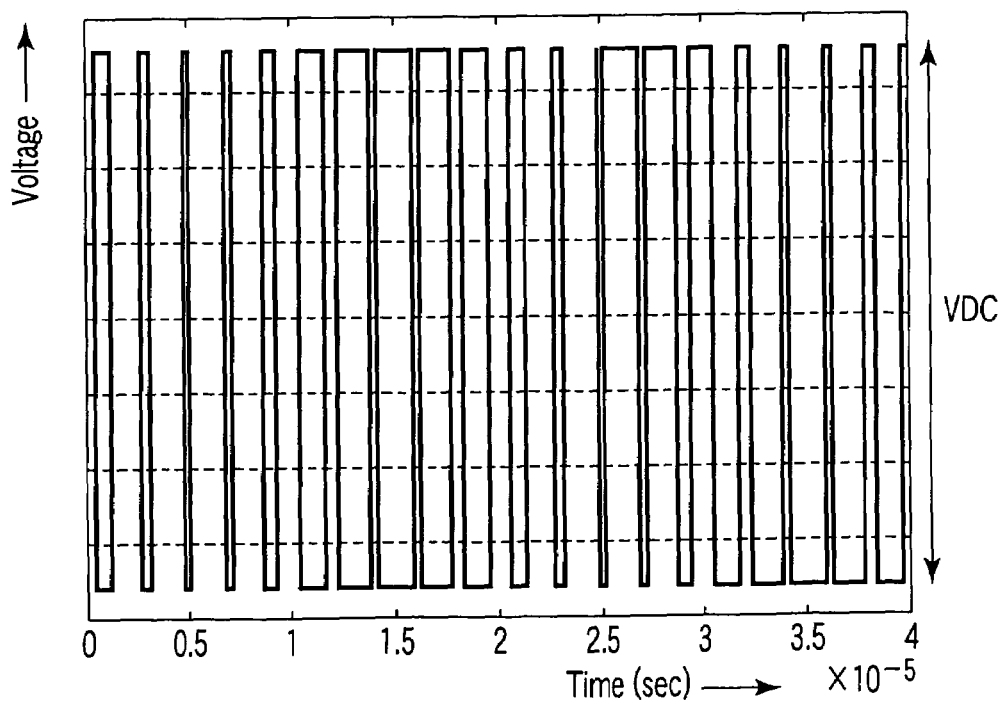
FIG. 22 is a waveform chart showing the output voltage of an inverter circuit in the seventh embodiment.

The output voltage supplied to the inverter circuit 2 from the resonance load circuit has a pulse-width modulated waveform. The pulse-width modulated waveform includes each frequency component of sinusoidal voltage and pulse voltage. A triangular wave signal having amplitude 1.0 is modulated using a sinusoidal voltage having amplitude 0.9. Therefore, the modulation degree of the output voltage from the inverter circuit 2 is 0.9. Thus, the output voltage from the inverter circuit 2 has a voltage waveform shown in FIG. 22.

In this case, the modulation signal component is expressed using the following equation.

$$Virms = VDC/(2\sqrt{2}) \cdot \alpha$$

where, Virms is an effective value of the lighting frequency fs component of the discharge lamp 7 included in the output voltage of the inverter circuit 2, and α is a modulation degree.

The effective value Virms is set to become approximately equal to the effective value VLrms of the lighting frequency fs component of the discharge lamp 7 included in the load voltage generated in the resonance load circuit using rated load. By doing so, the DC power supply voltage VDC is set higher. Specifically, the effective value VLrms is equivalent to the lamp voltage; therefore, VLrms=113 V is given in the foregoing case. As described above, α=0.9 is given; therefore, the DC power supply voltage VDC is 355V from the foregoing equation. The voltage value is the upper limit value of the settable DC power supply voltage. If the DC power supply voltage VDC is set higher than 355V, it is impossible to set required inductor component Lr and capacitor component Cf.

As described above, the DC power supply voltage VDC is set higher, and thereby, power VA generated in the inductor component Lr is made small. Therefore, circuit loss is reduced in the resonance load circuit. Moreover, power VA generated in the inductor component Lr is made small; therefore, the using inductor 6 is made into a small size.

Eighth Embodiment

According to the eighth embodiment, the following condition is given in the discharge lamp lighting device having the circuit configuration shown in FIG. 6.

Lighting frequency fs of discharge lamp 7: 20 kHz

Modulation degree of sinusoidal voltage generated from sinusoidal voltage source 21 with respect to triangular wave signal from triangular wave signal source 22: 0.9

Impedance declination of resonance load circuit in the lighting frequency fs when discharge lamp 9 is lighted at rating: 0°

Under the foregoing condition, inductance component Lr of the resonance load circuit when the frequency fc of the pulse voltage and loss of switching elements 3 and 4 were measured.

Figure 23:
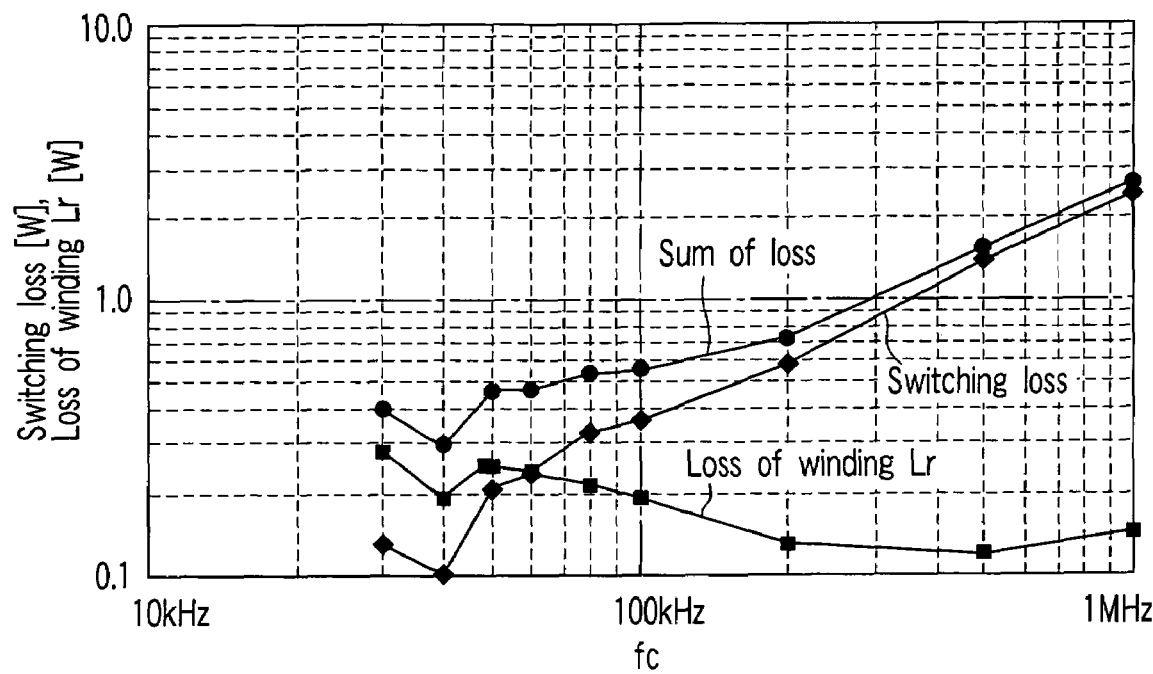
FIG. 23 is a graph showing an inductor component Lr of a resonance load circuit, loss of switching element and the sum of these losses when a frequency fc of pulse voltage is changed in an eighth embodiment of the present invention.

The result is shown in FIG. 23. As seen from FIG. 23, the foregoing inductor component Lr and loss of switching elements 3 and 4 becomes minimum when pulse voltage frequency fc=40 kHz=2*lighting frequency fs. The sum of loss of both switching elements becomes minimum when pulse voltage frequency fc=40 kHz=2*lighting frequency fs.

The minimum point of the inductor component Lr exists in the vicinity of the pulse voltage frequency fc=500 kHz. However, switching loss increases because the pulse voltage frequency fc is a switching frequency.

Thus, the foregoing inductor component Lr and switching loss of both switching elements 3 and 4 must be reduced without largely increasing switching loss of both switching elements 3 and 4. In order to achieve this, it is preferable that the pulse voltage frequency fc is set to a range less than five times as much as the lighting frequency fs. Specifically, according to the eighth embodiment, the pulse voltage frequency fc is set to a range from 30 kHz to 100 kHz, preferably, a range from 30 kHz to 50 kHz.

Ninth Embodiment

The ninth embodiment relates to lighting unit including the discharge lamp lighting device described in each embodiment.

Figure 24:
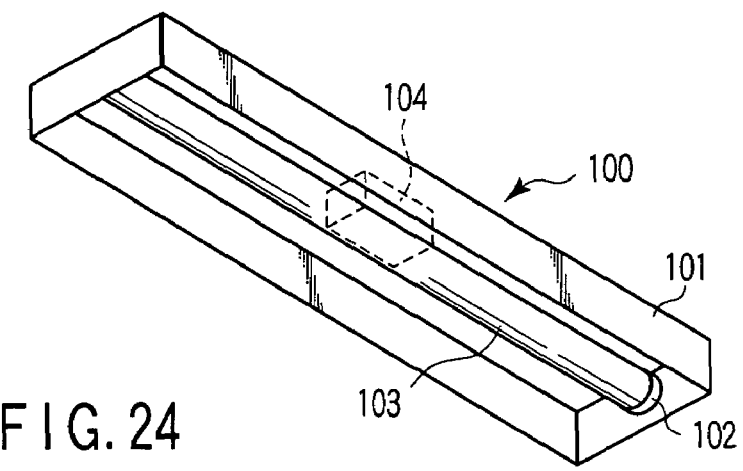
FIG. 24 is a perspective view showing a luminaire according to a ninth embodiment of the present invention.

FIG. 24 shows a luminaire 100. The luminaire 100 has the following structure. Specifically, a socket 102 of a luminaire main body 101 is attached with a discharge lamp 103. Any discharge lamp lighting device according to the foregoing embodiments is built in the luminaire 100 as a discharge lamp lighting device 104. The discharge lamp lighting device 104 lights the discharge lamp 103.

In the manner described above, it is possible to realize the luminaire including the discharge lamp lighting device according to the foregoing each embodiment. In other words, it is possible to realize the luminaire, which can improve power conversion efficiency. Moreover, the discharge lamp lighting device employing feedback control is used. By doing so, it is possible to realize lighting unit, which are capable of stably maintaining lighting of a discharge lamp even if the inductor 6 is made small.

In addition, the discharge lamp lighting device is configured so that the relation of Vs>Vc is given between output voltages Vs and Vc of frequency fs and fc components. The discharge lamp lighting device having the foregoing configuration is used, thereby realizing lighting unit, which are capable of sufficiently securing control margin of the output voltage. In addition, the impedance declination of the resonance load circuit is set to a range from −10° to 40° with respect to the lighting frequency fs of the discharge lamp. The DC power supply voltage is set so that the effective values VLrms and Virms are approximately equal to each other. In this case, the foregoing VLrms is an effective value of the lighting frequency fs component of the discharge lamp included in a load voltage generated in the resonance load circuit. The foregoing Virms is an effective value of the effective value Virms of the lighting frequency fs component of the discharge lamp included in an output voltage generated in the inverter circuit 2. By doing so, circuit loss is reduced; therefore, it is possible to realize lighting unit, which can make an inductor small size.

The present invention is applicable to a discharge lamp lighting device, which can reduce reactive power to improve power conversion efficiency, and to lighting unit.

What is claimed is:

1. A discharge lamp lighting device comprising:
an inverter circuit carrying out on/off control with respect to switch elements to convert a direct current power supply voltage into a high-frequency voltage;
a resonance load circuit supplied with the high-frequency voltage from the inverter circuit, and including an inductor, a capacitor and a discharge lamp lighted at a predetermined lighting frequency fs, and further, configured so that declination with respect to the lighting frequency fs is set to a range from −20° to 40° in impedance when the discharge lamp is operating at rating; and
a control circuit carrying out the following control of continuously generating a pulse voltage for driving on and off the switch elements at a cycle (period) shorter than a lighting cycle of the discharge lamp, and making pulse-width modulation with respect to an on-state width of the pulse voltage in accordance with a waveform change of a sinusoidal voltage corresponding to the lighting cycle, and further, supplying an approximately sinusoidal current to the discharge lamp from the inverter circuit.

2. A discharge lamp lighting device comprising:
an inverter circuit carrying out on/off control with respect to switch elements to convert a direct current power supply voltage into a high-frequency voltage;
a resonance load circuit supplied with the high-frequency voltage from the inverter circuit, and including an inductor, a capacitor and a discharge lamp lighted at a predetermined lighting frequency fs; and
a control circuit continuously generating a pulse voltage for driving on and off the switch elements at a cycle (period) shorter than a lighting cycle of the discharge lamp, having pulse voltage frequency fc set to a range less than five times as much as the lighting frequency fs, making pulse-width modulation with respect to an on-state width of the pulse voltage in accordance with a waveform change of a sinusoidal voltage corresponding to the lighting cycle, and further, controlling the supply of an approximately sinusoidal current to the discharge lamp from the inverter circuit.

3. A discharge lamp lighting device comprising:
an inverter circuit carrying out on/off control with respect to switch elements to convert a direct current power supply voltage into a high-frequency voltage;
a resonance load circuit supplied with the high-frequency voltage from the inverter circuit, and including an inductor, a capacitor and a discharge lamp lighted at a predetermined lighting frequency fs;
a control circuit carrying out the following control of continuously generating a pulse voltage for driving on and off the switch elements at a cycle (period) shorter than a lighting cycle of the discharge lamp, and making pulse-width modulation with respect to an on-state width of the pulse voltage in accordance with a waveform change of a sinusoidal voltage corresponding to the lighting cycle, and further, supplying an approximately sinusoidal current to the discharge lamp from the inverter circuit;
lamp current detection means for detecting a lamp current flowing through the discharge lamp; and
feedback control means for carrying out variable control with respect to a frequency so that the lamp current becomes constant, the frequency having a sinusoidal voltage waveform corresponding to a lighting cycle used for making pulse-width modulation of an on-state width in accordance with an amount of lamp current detected by the lamp current detection means.

4. The device according to any one of claims 1 to 3, wherein the control circuit makes the following control of:
carrying out variable control of a drive frequency driving on and off the switch elements while giving preheat with respect to the discharge lamp for a predetermined time;
applying a starting voltage for a predetermined time and carries out lighting maintaining control after a lamp starts;
carrying out control of gradually changing a frequency at least in a changeover from a preheat reference drive frequency to a starting voltage application reference drive frequency,
continuously generating a pulse voltage for driving on and off the switch elements at a cycle (period) shorter than a lighting cycle of the discharge lamp in the lighting maintaining control;
making pulse-width modulation with respect to an on-state width of the pulse voltage in accordance with a waveform change of a sinusoidal voltage corresponding to the lighting cycle; and
supplying an approximately sinusoidal current to the discharge lamp from the inverter circuit.

5. The device according to claim 1, wherein the DC power supply voltage is set so that an effective value VLrms of the lighting frequency fs component of the discharge lamp included in a load voltage generated in the resonance load circuit when the discharge lamp is rated-operating becomes approximately equal to an effective value Virms of the lighting frequency fs component of the discharge lamp included in an output voltage generated in the inverter circuit.

6. The device according to any one of claims 1 to 3, wherein the control circuit sets a modulation degree of pulse-width modulation to 0.8 or more.

7. A luminaire characterized by comprising:
 a discharge lamp lighting device according to any one of claims 1 to 3; and
 a luminaire main body having the discharge lamp lighting device.

* * * * *